US012402553B2

(12) United States Patent
Obrist

(10) Patent No.: US 12,402,553 B2
(45) Date of Patent: Sep. 2, 2025

(54) PRECISION SOWING METHOD AND DEVICE

(71) Applicant: SYNGENTA CROP PROTECTION AG, Basel (CH)

(72) Inventor: Lukas Obrist, Kaiseraugst (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 910 days.

(21) Appl. No.: 16/971,951

(22) PCT Filed: Feb. 19, 2019

(86) PCT No.: PCT/EP2019/054119

§ 371 (c)(1),
(2) Date: Aug. 21, 2020

(87) PCT Pub. No.: WO2019/162283

PCT Pub. Date: Aug. 29, 2019

(65) Prior Publication Data

US 2021/0084807 A1 Mar. 25, 2021

(30) Foreign Application Priority Data

Feb. 21, 2018 (CH) ................................ CH00212/18

(51) Int. Cl.
*A01C 1/06* (2006.01)
*A01C 7/04* (2006.01)
(Continued)

(52) U.S. Cl.
CPC ................ *A01C 1/06* (2013.01); *A01C 7/105* (2013.01); *A01C 21/00* (2013.01)

(58) Field of Classification Search
CPC ........... A01C 1/06; A01C 7/105; A01C 21/00; A01C 7/04
(Continued)

(56) References Cited

U.S. PATENT DOCUMENTS 1,409,564 A 3/1922 Mitchell
3,383,290 A * 5/1968 Vilain ........................ C12C 1/15 435/291.5
(Continued)

FOREIGN PATENT DOCUMENTS

BR PI0902543 A2 2/2011
CA 3014724 C * 10/2022 ............... A01C 1/06
(Continued)

OTHER PUBLICATIONS

Written Opinion of the International Authority and International Search Report for International Patent Application PCT/EP2019/054119, mailed May 24, 2019.

*Primary Examiner* — Joshua D Huson
*Assistant Examiner* — Spencer T Callaway
(74) *Attorney, Agent, or Firm* — BakerHostetler; Toni-Junell Herbert

(57) ABSTRACT

In a sowing method and a corresponding sowing device for discharging granular seed onto an underlying surface for seed, seeds (K) which are present in a reservoir container (10) are removed from the reservoir container and separated by means of a separating device (20) and successively allowed to fall onto the underlying surface (B) for seed. After the separated seeds (K) leave the separating device (20) seed dressing is applied to them by means of an application device (30) during their falling movement onto the underlying surface (B) for seed.

20 Claims, 4 Drawing Sheets

(51) Int. Cl.

| | |
|---|---|
| ***A01C 7/06*** | (2006.01) |
| ***A01C 7/10*** | (2006.01) |
| ***A01C 21/00*** | (2006.01) |

(58) Field of Classification Search

USPC ......... 111/127, 915–917, 200, 900, 130, 129

See application file for complete search history.

(56) References Cited

U.S. PATENT DOCUMENTS

| | | | | |
|---|---|---|---|---|
| 4,119,242 | A * | 10/1978 | Jesty | A01C 7/042 221/211 |
| 4,356,934 | A * | 11/1982 | Knake | A01C 1/06 47/DIG. 9 |
| 6,070,539 | A | 6/2000 | Flamme et al. | |
| 6,155,185 | A | 12/2000 | Memory et al. | |
| 6,192,813 | B1 * | 2/2001 | Memory | A01C 7/081 340/684 |
| 6,216,615 | B1 * | 4/2001 | Romans | A01C 7/04 111/177 |
| 8,850,995 | B2 | 10/2014 | Garner et al. | |
| 10,582,655 | B2 * | 3/2020 | Kowalchuk | B05B 12/06 |
| 11,224,156 | B2 * | 1/2022 | Schnier | A01C 7/105 |
| 2004/0231575 | A1 * | 11/2004 | Wilkerson | A01C 7/06 111/127 |
| 2014/0277959 | A1 | 9/2014 | Wagers et al. | |
| 2014/0379228 | A1 | 12/2014 | Batcheller et al. | |
| 2016/0374260 | A1 * | 12/2016 | Kowalchuk | A01C 7/082 111/170 |
| 2018/0014456 | A1 * | 1/2018 | Conrad | A01C 7/102 |

FOREIGN PATENT DOCUMENTS

| | | | |
|---|---|---|---|
| DE | 3415160 | C2 * | 6/1990 |
| EP | 1504641 | A1 | 2/2005 |
| JP | S6167407 | A | 4/1986 |
| JP | H06153643 | A | 6/1994 |
| JP | 2000262112 | A | 9/2000 |
| JP | 2016202176 | A | 12/2016 |
| WO | 98/42178 | A1 | 10/1998 |
| WO | 2016209217 | A1 | 12/2016 |

* cited by examiner

PRECISION SOWING METHOD AND DEVICE

CROSS-REFERENCE TO RELATED APPLICATIONS

This application is a 371 National Stage application of International Application No. PCT/EP2019/054119 filed Feb. 19, 2019 which claims priority to CH 00212/18, filed Feb. 21, 2018, the entire contents of these applications are hereby incorporated by reference.

The invention relates to a sowing method according to the preamble of independent claim 1 and to a corresponding sowing device according to the preamble of independent claim 9.

Precision sowing machines are used in agriculture for introducing seed into the soil. They have small sowing coulters or ploughshares which form grooves with a depth of several centimetres in the arable soil. Seeds which are kept in a reservoir container and fed to the separating element are placed individually in these grooves or furrows. The furrows are then closed again by a refilling means which runs behind, for example by means of what is referred to as a harrow. The advantage of these agricultural machines for sowing plant seeds is the precise and uniform depth positioning of the seed, which gives rise to less consumption by birds and to a more uniform field emergence compared with broad spreading in which the seeds are distributed widely or randomly over the entire arable field.

In order to assist the growth of the crop, the use of crop protection products in the form of chemical or biological substances is conventional practice in agriculture. These substances include, inter alia, insecticides for protecting against insects, miticides for protecting against mites, fungicides for protecting against fungal pathogens and nematicides for protecting against nematodes. These crop protection products are frequently applied to the field by spraying. However, this can only reach the young plant which has already grown, as a result of which certain plant diseases which already occur in the initial stage of growth or an insect pest which attacks sprouting seedlings cannot be treated efficiently. Another possible application is to deposit microgranulates in the seed furrow. Precise positioning of the crop protection product is not possible here, since the entire seed furrow including the intermediate spaces between the seeds is always treated. This gives rise to an unnecessarily high consumption of protection product.

In order to protect the seed and the seedling against fungi, nematodes, mites and insects it is therefore already now customary for the seed to be treated centrally with what are commonly interchangeably referred to as seed treatments or seed dressings. In this context, the respective active substance or a combination of active substances is applied in the form of a coating directly to each individual seed. In addition to the actual active substances with a pesticidal effect, the seed dressing also generally contains adhesive agents for improving the adhesion of the active substances to the seed as well as dispersants and colouring agents. Since the necessary crop protection product is supplied with the correct dosing to each seed or each plant and in situ as a result of the seed dressing, a relatively small quantity of active substance compared to a spraying application is sufficient to protect the seedling or plant effectively. This method is therefore also fundamentally advantageous in respect of environmental aspects.

However, when seed which has been coated in such a way is handled by the farmer, partial abrasion of the applied crop protection product can occurs in the sowing machine during the sowing process owing to mechanical loads, as a result of which a fine seed dressing dust which is contaminated with active substances can be produced. In particular in the now customary pneumatically operating precision sowing machines, in which in order to introduce the seed into the soil in a controlled way, a partial vacuum or excess pressure can be applied to a separating element, this fine seed dressing dust can be taken up by the air stream of a blower and dispersed. In this context, the fine seed dressing dust can accumulate in the sowing machine, which can restrict the functional capability of the system and constitute a possible hazard for the operator of the system. Moreover, the escape of the seed dressing dust from the sowing machine into the surroundings is particularly problematic, which can constitute a hazard for people and animals, in particular for beneficial insects.

The disadvantages associated with the emission of seed dressing dust have already been presented as a subject matter in DE 20 2012 101 029 U1, which proposes a sowing machine with a dust precipitator, by means of which air which contains dust particles and is sucked in during the sowing process can be split into an air component and into a dust component, wherein the dust component which is separated from the air component can subsequently be introduced into the soil using special introduction means.

WO 2017/182261 A1 describes a precision sowing machine with the aid of which the generation of particle dust can be already prevented, and however can at least be significantly reduced.

This known precision sowing machine for introducing seeds into a soil comprises a separating element which is suitable for separating seeds which have been fed from a reservoir container and outputting them individually, as well as an application unit for applying a seed dressing to a separated seed. The application unit is arranged with respect to the separating element in such a way that the application of the seed dressing to a seed takes place after this seed has been separated and before this seed is output from the separating element. The separating element is embodied as a rotating perforated disc to which a partial vacuum or an excess pressure can be applied. The application unit comprises a nozzle which is embodied as a pneumatically driven valve and has the purpose of dosing the seed dressing. The application unit comprises a sensor for detecting a separated seed and/or the position thereof, and the application of the seed dressing to a seed can be triggered by a signal of the sensor. The application of the seed dressing takes place in a contactless fashion, wherein the nozzle is at a distance of 2-10 mm from the surface of the seed to be treated. Quantities of seed dressing between 0.3 and 5 μl per seed to be treated can be dosed with the nozzle.

Although this precision sowing machine which is described in WO 2017/182261 A1 prevents or reduces the generation of particle dust, it has the disadvantage that the separating element, specifically the rotating perforated disc thereof, is contaminated or soiled during the application of the seed dressing by means of said separating element. This is also aggravated by the effect of the applied partial vacuum.

The present invention is intended to improve a method and a corresponding device for discharging granular seed to the effect that contamination or soiling of the components of the device, in particular also of the separating element thereof, by seed dressing is avoided. Specifically, the application to the individual seeds is to take place without contamination.

The means of achieving this object on which the invention is based are the sowing method according to the features of independent claim 1 and the device according to the features of independent claim 9.

Further expedient and particularly advantageous refinements of the sowing method according to the invention and of the sowing device according to the invention are the subject matter of the respective dependent claims.

The invention also relates to a computer-readable storage medium comprising instructions which, when executed by a computer, cause the computer to carry out the steps of the disclosed method.

In respect of the sowing method, the essence of the invention consists in the following: in a sowing method for discharging granular seed onto an underlying surface for seed, seeds which are present in a reservoir container are removed from the reservoir container and separated. Seed dressing is applied to the separated seeds, and the individual seeds to which seed dressing has been applied are successively delivered onto the underlying surface for seed. The application of seed dressing to the separated seeds takes place here during their falling movement onto the underlying surface for seed. The seeds may fall onto the underlying surface along a straight or curved fall line. For example, if the seeds have a velocity component substantially parallel to the underlying surface, for example due to horizontal movement of the sowing device as it traverses the underlying surface, as well as a downward acceleration component due to gravity, then the fall line may be substantially parabolic in a frame of reference where the underlying surface is stationary, while the fall line may be substantially straight in a frame of reference where the sowing device is stationary.

Applying seed dressing to the seeds, as it were, in free fall prevents contamination of the components of the corresponding sowing device. In particular, seed dressing is not applied to the seeds while they rest on a surface or while they are held in a container or reservoir or other device. In this way, it is possible to apply seed dressing to the seeds without at the same time contaminating parts of the sowing device with the seed dressing, as in the prior art.

After the seeds have been separated they may be allowed to fall through a sensor shaft, wherein the passage of each separated seed through the sensor shaft is detected by sensor and a time delay until the seed arrives at an impact location, located along the fall line of said seed, outside the sensor shaft is calculated, and wherein the application of seed dressing to the seed takes place at the impact location in accordance with the calculated time delay. In this way, precise application of seed dressing to the seeds can be achieved.

In this context, a triggerable application nozzle is advantageously used to apply seed dressing to the seeds, which application nozzle ejects, each time it is triggered, a defined quantity of seed dressing along an spraying trajectory, wherein the impact location is defined as an intersection point between the fall line of a seed and the spraying trajectory of the application nozzle. The spraying trajectory may be essentially linear. The application nozzle is connected to a source of seed dressing. The seed dressing is advantageously in fluid form, for example in liquid, gel or droplet form. It is conceivable that a seed dressing in the form of an adhesive powder could be used. The defined quantity of seed dressing may be from 0.1 to 5 μl, optionally from 0.3 to 5 μl, optionally from 1 to 4 μl, optionally from 2 to 3 μl, optionally about 2.5 μl. However, it will be appreciated that different quantities of seed dressing may be appropriate for differently-sized seeds. The seed dressing may be supplied to the application nozzle by way of a controllable valve, for example a solenoid valve or a pneumatically- or hydraulically-driven valve. By appropriate control of the valve, it is possible to control a volume of seed dressing delivered each time the application nozzle is triggered. The delivered volume may be varied as required, for example for different seed positions or different seed dressings or different seed types. Moreover, in some embodiments a pressure of the seed dressing supplied to the application nozzle may be controlled, for example by way of the pump, so as to control or adjust a velocity of the sprayed seed dressing.

The transverse position of each seed within the sensor shaft is advantageously detected by at least one sensor. The impact location may be defined individually on the basis of the transverse position, and accordingly the time delay until the seed arrives at the impact location can be calculated individually. In this way, a sensor shaft with a relatively wide cross section can be used, with the result that the falling movements of the seeds are not impeded.

The application nozzle is advantageously oriented in such a way that its spraying trajectory intersects the fall lines of the seeds at an acute angle of preferably 30°-60°. As a result seed dressing can be reliably applied to seeds moving on various fall lines. In some embodiments, the intersection between the spraying trajectory and a fall line may be up to 5 cm, or up to 10 cm, from the application nozzle. It is generally preferred for the distance between the application nozzle and the intersection to be short, since this helps to improve the application accuracy of the seed dressing.

Two or more different compositions may be applied to the separated seeds by means of two or more application nozzles. As a result it is possible to treat the seeds with a seed dressing made up of a combination of various or different compositions.

The compositions to be applied in the seed dressing are typically formulated as liquid formulations, e.g. aqueous solutions or organic solutions or a mixture of phases, as dispersions or suspensions of particles in aqueous or organic liquids or pastes that are seed safe for the periods of time in the frame of application, sowing and germination, wherein the only limitation is that the composition can be applied at the necessary dose rate and volume and pressure and rheological properties and dynamic surface tension and adherence. Typically the active substance is suspended or emulsified or dissolved or absorbed or encapsulated in a liquid phase or blended with a carrier as a water dispersible powder or water dispersible granule. Classical agrochemical formulation such as flowable suspension (FS) and suspension concentrates (SC) and emulsion (EW; ES) and solutions (SL; LS) and encapsulated suspension (CS) and water dispersible powders (WS; WP) or water dispersible or water soluble granules (WG; SG) may also be applied, provided they meet the same conditions. In some embodiments, the composition to be applied may comprise nutrients, fertilizers and/or inoculants.

Compositions that can be employed with the device and in the method according to the present invention, in certain embodiments, may also include additional components, including additional adjuvants, biocides, or other components.

The active substance(s) in a given composition is/are chosen according the desired pesticidal effect of the composition being applied in the seed dressing, Typically the active substances are insecticides, miticides, fungicides or nematicides, such as those known, for example, from "The Pesticide Manual", 18th Ed., British Crop Protection Council, October 2018.

The seed to be dressed may be any field crop seed being planted with conventional planting technologies. In some embodiments the planting technology is a single seed planting technology. None limiting examples of seeds that can be planting with single seed planting technologies include, inter alia, seeds from corn, maize, soybean, cotton, sunflower, sugar-beet, and sorghum.

With respect to the sowing device, the essence of the invention is as follows: a sowing device for discharging granular seed onto an underlying surface for seed has a reservoir container for the granular seed, a separating device which is designed to separate seeds fed from the reservoir container and to output them individually, and an application device to apply seed dressing to the separated seeds. The application device is configured to apply seed dressing to the separated seeds after they leave the separating device during their falling movement onto the underlying surface for seed.

Applying seed dressing to the seeds, as it were, in free fall prevents contamination of the components of the sowing device.

The application device is advantageously embodied as a structurally independent unit and is arranged underneath the separating device in the falling path of the separated seeds. As a result, the application device can be used on various sowing devices.

The application device advantageously has a sensor shaft which is open at both ends, and the application device is arranged in such a way that the separated seeds fall through the sensor shaft on their path from the separating device to the underlying surface for seed. This permits the falling seeds to be decoupled from external influences. For example, seeds falling within the sensor shaft may be protected from crosswinds or from rain.

At least one sensor for detecting the passage of a seed through the sensor shaft is advantageously arranged on an interior surface of the sensor shaft. The application device may have an application nozzle for the seed dressing, which application nozzle may be configured to apply a defined quantity of seed dressing to a seed which has fallen through the sensor shaft, once the seed is outside the sensor shaft, wherein the application device has a controller which cooperates with the at least one sensor, and which controller brings about the triggering of the application nozzle in accordance with sensor signals generated by the at least one sensor, in order to apply seed dressing to the seed. In this way, precise application of seed dressing to the seeds is possible.

The sensor may be an optical sensor, for example a CMOS or CCD-type sensor. In some embodiments, the sensor may be an optical sensor provided on one side of the sensor shaft in combination with a light source on the other side of the sensor shaft, thus forming an optical gate to detect when a seed passes between the light source and the optical sensor. In some embodiments, the sensor detects light reflected from a falling seed onto the sensor, for example by detecting a colour change or a change in light intensity. In these embodiments, the light source and the sensor may be on the same side in relation to the falling seed. For example, the light source and the sensor may be on the same side of the sensor shaft.

In some embodiments, at least two sensors for detecting the passage of a seed through the sensor shaft may be arranged one after the other on an interior surface of the sensor shaft, in the falling direction of the seeds. As a seed falls, it may trigger a first sensor and subsequently a second sensor, thus allowing a rate of fall of the seed to be calculated by the controller. The controller can then calculate, on the basis of the sensor signals of the at least two sensors, a time delay after which it brings about the triggering of the application nozzle so as to target the seed correctly with the seed dressing. In this way, the rate of fall of the seeds can be taken into account during control of the application of seed dressing to the seed.

In some embodiments, at least one array of sensors may be provided on an interior surface of the sensor shaft. The at least one array may be a one-dimensional array, for example a linear array. The at least one array may be a two-dimensional array. By providing an array of sensors, it is possible to determine a lateral position of a seed within the sensor shaft with reference to a lateral dimension of the array.

In some embodiments, the at least one sensor or at least one array of sensors may be configured to detect a size of each seed. The application device may be controlled to vary the spraying parameters (e.g. volume, velocity, trajectory, pressure etc.) as a function of detected seed size and/or seed velocity and/or seed trajectory.

The application nozzle is advantageously designed to eject, each time it is triggered, a defined quantity of seed dressing. The seed dressing may be ejected along a spraying trajectory. The spraying trajectory may be essentially linear. The controller may calculate the position of an impact location at which the spraying trajectory and the fall line of the seed to which seed dressing is applied intersect. The controller may calculate the time delay on the basis of the position of the impact location and of the rate of fall of the seed.

The application nozzle may be configured to eject a spray or droplets of seed dressing along the spraying trajectory towards the seed. The spray or droplets may cover the entire surface of the seed, or may cover only part of the surface of the seed. In particular, droplet-shaped application is to be understood as meaning here an application of seed dressing which does not completely surround the seed but rather covers only a relatively small ("punctiform") or relatively large part of the surface of the seed. The seed dressing may be configured such that it adheres as droplets to the seed. In some embodiments, the seed dressing may be chosen to dry relatively quickly and without loss of adhesion to the surface of the seed. In some embodiments, the seed dressing may be chosen so as not to dry before the seed reaches the underlying surface.

The application nozzle may comprise or be made of a corundum material, such as sapphire or ruby. In some embodiments, the application nozzle may comprise or be made of a ceramic material or a hard alloy material. It is preferred that the application nozzle is made of a hard material that is resistant to wear, abrasion and/or erosion. Abrasive particles in the seed dressing can cause unacceptable erosion of nozzles made of conventional softer metal materials.

The application nozzle is advantageously oriented in such a way that its spraying trajectory intersects the fall lines of the seeds at an acute angle of preferably 30°-60°. As a result, seed dressing can be reliably applied to seeds which are moving on various fall lines. It will be appreciated that a seed falling from the sensor shaft at a location close to the application nozzle will intersect the spraying trajectory before a seed falling from the sensor shaft at a location remote from the application nozzle. This is because the spraying trajectory is angled downwardly with respect to a horizontal direction across the sensor shaft. Accordingly, when the at least one sensor detects that a seed is falling on a fall line remote from the application nozzle, a time delay needs to be applied when activating the application nozzle so as to compensate for the additional time needed for the seed to reach the intersection between the fall line and the spraying trajectory. Account also needs to be taken of the additional time needed for the spray to reach the seed falling on the fall line remote from the application nozzle.

In some embodiments, a plurality of sensors, which detect the transverse position of the seeds within the sensor shaft, are advantageously arranged on the sensor shaft, wherein the controller calculates individually the time delay for each seed taking into account the transverse position of the seed. In this way, a sensor shaft with a relatively wide cross section can be used, with the result that the falling movements of the seeds are not impeded.

The application device advantageously has two or more application nozzles, by means of which two or more seed dressings can be applied to the separated seeds. In this way, the one or more seed dressings can be applied to the seeds by means of the same application device, depending on requirements.

In some embodiments, at least one additional sensor may be provided to detect whether or not a particular seed has actually been hit by the spray from the application nozzle. The additional sensor may be an optical sensor, for example a CMOS- or CCD-type sensor. The at least one additional sensor may detect a change in light reflected from the seed due to application of the spray. This may be a change in reflectance or, where the seed dressing has a particular colour (for example, imparted by a dye additive), the additional sensor may detect a colour change in reflected light. Data may be collected giving information as to a proportion of seeds that have been correctly provided with seed dressing by the applicator nozzle. In some embodiments, feedback control may be provided so as to vary one or more spray parameters, for example one or more of a spray pressure, spray trajectory, spray volume, seed dressing temperature and/or seed dressing viscosity, in response to detecting that an insufficient proportion of seeds have been correctly provided with seed dressing by the applicator nozzle.

In some embodiments, the sensor shaft may be omitted. Instead of falling down a sensor shaft as described above, seeds may be dispensed from the reservoir container directly to the underlying surface. Alternatively, the seeds may be extracted from reservoir container by mechanical or other means, for example a conveyor or a brush belt, before being allowed to fall freely to the underlying surface. In these embodiments, the at least one sensor is positioned and the reservoir container configured such that the seeds fall from the reservoir container along fall lines that traverse or pass the at least one sensor, allowing falling seeds to be detected as described above. The at least one application nozzle applies seed dressing to individual seeds as they fall freely from the reservoir container, and the at least one application nozzle is activated and controlled on the basis on signals from the at least one sensor. As before, an important advantage is that the seed dressing is directed towards the seeds while in free fall, thereby reducing contamination of fixed or other machinery surfaces with seed dressing.

In some embodiments, geolocation data may be collected while the seeds are being sown, thus enabling a map to be generated of the underlying surface (for example, a field) including data relating to spray parameters and/or composition of the seed dressing. Geolocation data may be collected by way of a global navigation satellite system such as GPS, GLONASS, Galileo or similar.

The controller may include a computer-readable storage medium comprising instructions which, when executed by a computer, cause the computer to carry out various of the steps described above. In particular, but not exclusively, the controller may be programmed to perform one or more of: processing signals from the at least one sensor, triggering the application device, calculating the delay time, calculating the rate of fall of a seed, determining a position of a seed, determining whether or not a seed has been correctly applied with seed dressing, determining geolocation data, and adjusting parameters of the application of seed dressing from the application device.

The application device of the sowing device according to the invention can be used on sowing devices of various types. For this reason, independent protection is also claimed for an application device which is designed to apply seed dressing to separated seeds during a falling movement of the seeds.

In the text which follows, the invention will be explained in more detail with reference to exemplary embodiments illustrated in the drawing, in which.

The following convention applies to the following description: if all the parts in a figure are not provided with reference symbols, reference is therefore made to the respective other figures in conjunction with the respectively associated parts of the description.

An underlying surface for seed is understood in the context of the present invention to be an agricultural soil onto which granular seed is applied. Seed is composed of individual seeds. Seed dressing is understood to be a substance formulation which is a liquid or a gel and which contains active substances with a fungicidal and/or insecticidal and/or growth-promoting effect, and additionally can also contain adhesive agents, dispersant and colouring agents. In some embodiments, the seed dressing may be an adhesive powder. In the following description, all the positional information and directional information, such as e.g. top, bottom, above, below, upwards, downwards, vertical, horizontal, etc. relate to the upright position of the sowing device according to the invention as illustrated in the figures and corresponding to their practical use.

Figure 1:
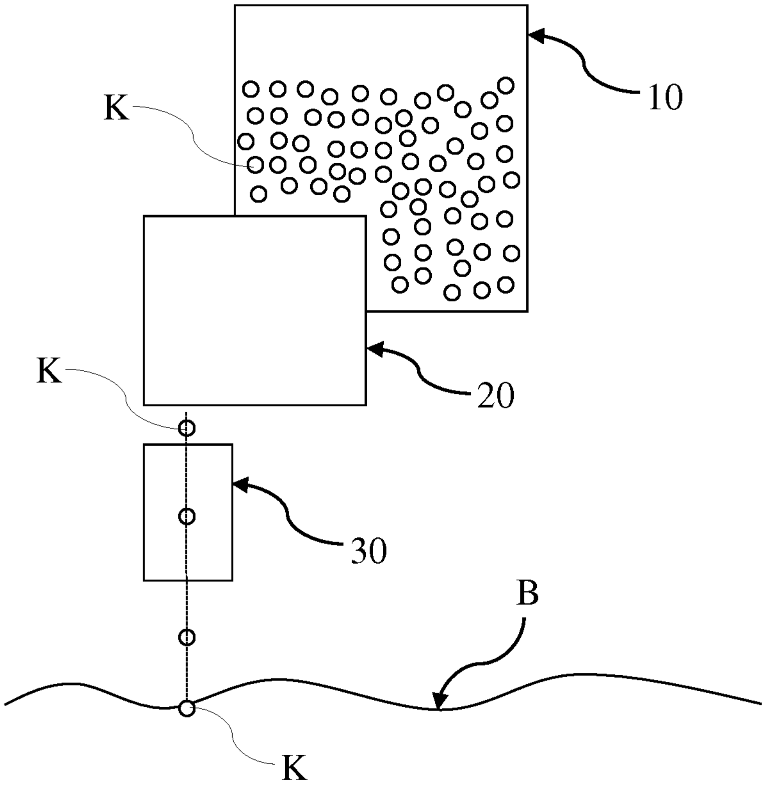
FIG. 1 shows a schematic overall illustration of the sowing device according to the invention.

According to the overall view in FIG. 1, the sowing device comprises a reservoir container 10 for granular seed, a separating device 20 which is designed to separate seeds K fed from the reservoir container and to output them individually, and an application device 30 for applying seed dressing to the seeds K which are output individually by the separating device 20. The application device is designed and arranged here in such a way that it can apply seed dressing to the separated seeds K after they leave the separating device 20 during their falling movement onto the underlying surface B for seed.

The entire sowing device is usually mounted during practical use on an agricultural vehicle such as e.g. a tractor. In this context, a plurality of sowing devices can also be arranged on the vehicle, with the result that seed can be discharged simultaneously into a plurality of seed furrows. The seed devices can, of course, also be applied with a common reservoir container here.

The essential difference of the sowing device according to the invention with respect to the prior art known, in particular, from the specified WO 2017/182261 A1 is that seed dressing is not applied to the seeds on the separating device 20 but rather after they leave the latter, during their falling movement onto the underlying surface B for seed. The application device 30 is embodied and arranged in a specific way for this purpose, as is also explained below in detail. The reservoir container 10 and the separating device 20 may be embodied in the same way as the prior art, for example as described in WO 2017/182261 A1. A further explanation of these components of the sowing device according to the invention is therefore not necessary.

Figure 2:
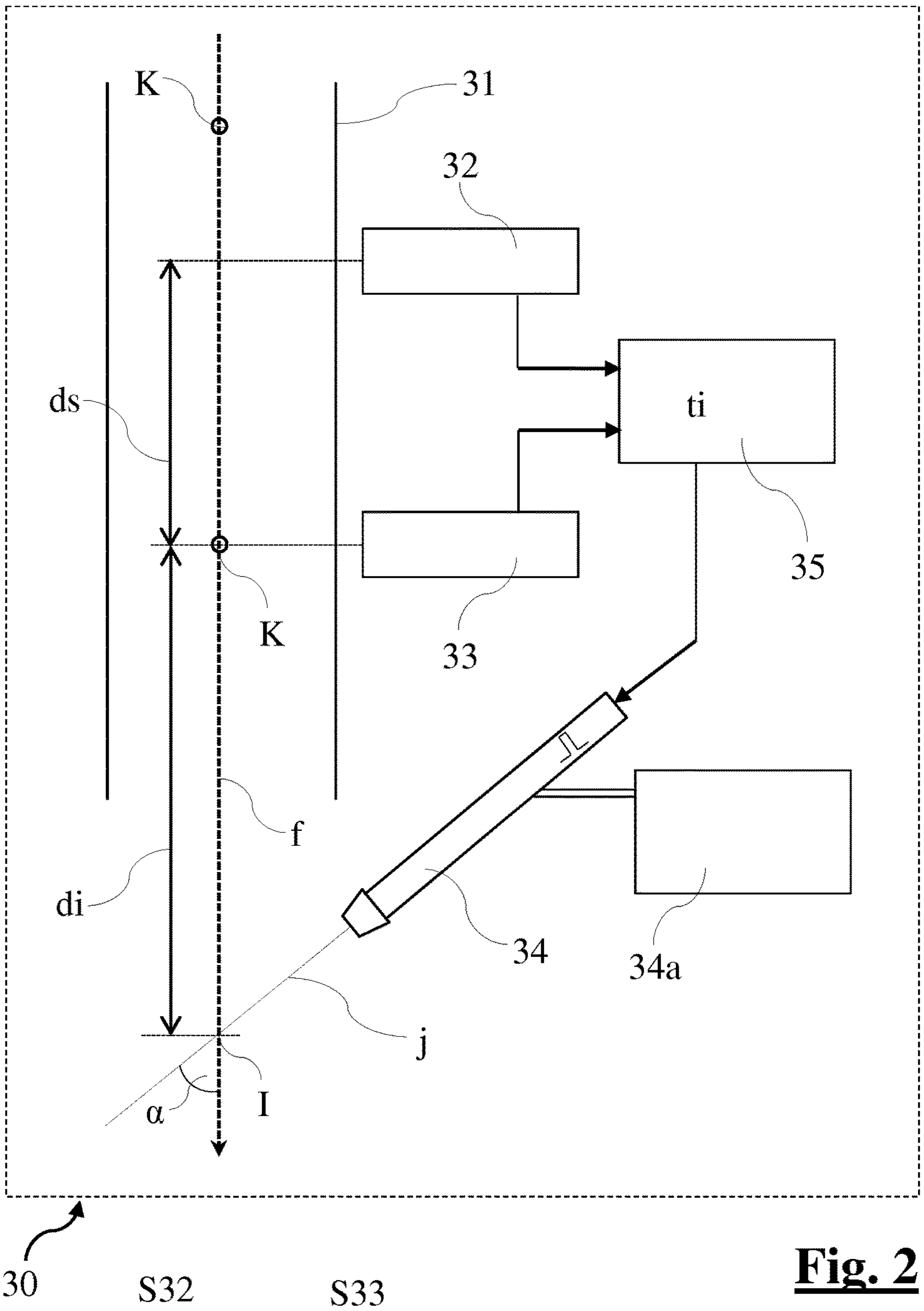
FIG. 2 shows a schematic illustration of an application device of a first exemplary embodiment of the sowing device according to the invention.

FIG. 2 shows schematically the basic design of an embodiment of the application device. It comprises a sensor shaft 31 which is oriented vertically during practical use and is open at the top and the bottom, two sensors 32 and 33 which are arranged spaced apart vertically thereon, an application nozzle 34 for seed dressing, which nozzle is fed from a seed dressing reservoir container 34*a*, and an electronic controller 35.

The application device 30 and/or the sensor shaft 31 thereof, are/is arranged underneath the separating device 20 in such a way that the individual seeds K which are output by the latter fall through the sensor shaft 31. After they emerge from the sensor shaft 31, seed dressing is applied to the seeds K by means of the application nozzle 34, and the seeds K then fall onto the underlying surface for seed.

The two sensors 32 and 33 detect the passage of the seeds K through the sensor shaft 31. They generate a pulse-shaped sensor signal S32 or S33 if a seed K falls through its respective detection range. Suitable sensors are known prior art and therefore do not require any more detailed explanation.

Figure 3:
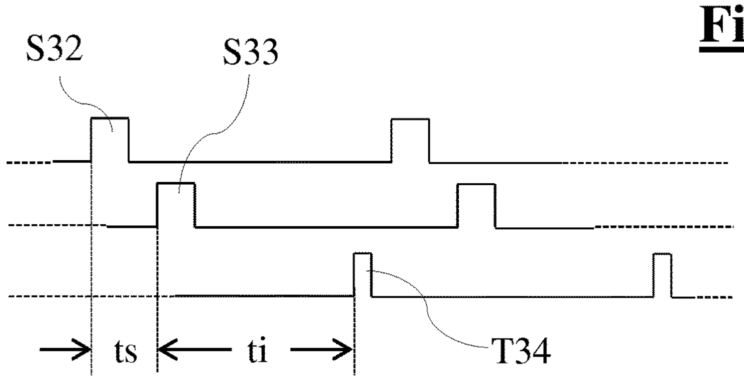
FIG. 3 shows a pulse/time diagram.

The sensor signals S32 and S33 are illustrated in FIG. 3. In accordance with the predefined (vertical) distance ds between the two sensors 32 and 33 and the rate of fall of the seeds K in the sensor shaft 31, the sensor signals S32 and S33 occur at a time interval ts. This is a measure of the rate of fall of the seeds K in the sensor shaft 31. The two sensor signals S32 and S33 are fed to the controller 35 and processed there, in a way to be described below, for the actuation of the application nozzle 34.

The application nozzle 34 is designed to eject, each time it is actuated or triggered, a predefined quantity of seed dressing of typically 0.3-5 μl along an essentially linear spraying trajectory j, therefore as it were to output a "shot of seed dressing". Suitable application nozzles include corundum, ceramic or hard alloy nozzles. The application nozzle 34 can be embodied in such a way that it permits essentially droplet-shaped application of the seed dressing to a respective seed in each application process. Essentially droplet-shaped application is to be understood as meaning here an application of seed dressing which does not completely surround the seed but rather covers only a relatively small ("punctiform") or relatively large part of the surface of the seed. The seed dressing is expediently configured here in such a way that it adheres as droplets to the seed without a loss of spray, and dries, without in the process losing its adhesion. The application nozzle 34 can be used, for example, with a pneumatically driven valve. It is therefore possible for valves for contactless micro-dosing to be used which are closed in the position of rest and can be switched by electro-pneumatic drive with opening times of less than 1 ms. Such valves generally have high dosing frequencies and very high dosing accuracies, as a result of which an extremely precise and reproducible dosing process is ensured. Other possible valves include solenoid valves.

FIG. 2 illustrates an impact location I which is defined by the intersection point of the fall line f of the seeds K and the spraying trajectory j of the application nozzle 34. The application nozzle 34 is oriented in such a way that its spraying trajectory j intersects with the fall line f of the seeds K at an acute angle α of approximately 30°-60°. The impact location I is outside or underneath the sensor shaft 31 here. A "shot of seed dressing" is output when a seed K reaches the impact location I. This is the case, according to the spatial distance di between the sensor 33 and the impact location I and the rate of fall of the seeds K, after a time delay ti after the triggering of the lower sensor 33. The controller 35 calculates the time delay ti with reference to the two sensors S32 and S33 and then outputs a trigger pulse T34 (FIG. 3) which triggers the application nozzle 34 and brings about the outputting of a "shot of seed dressing", which then applies seed dressing to the seed which is located at the impact location I. The time delay ti also takes into account the system-inherent response time of the application nozzle 34 and the virtually negligible flight time of the seed dressing from the application nozzle 34 to the impact location I.

Figure 4:
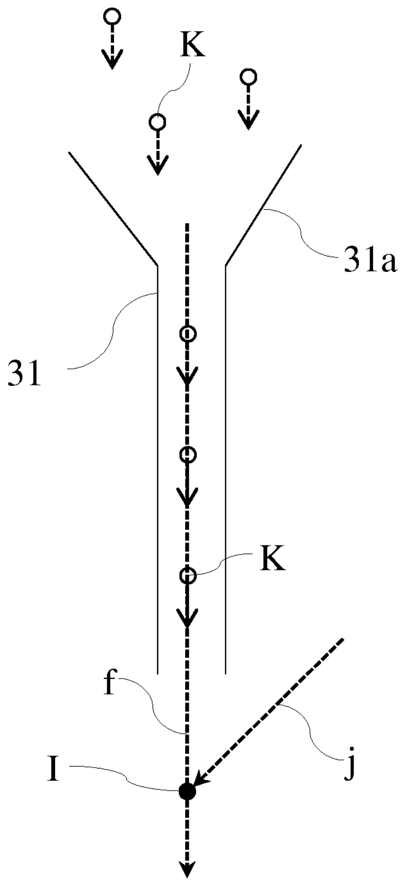
FIG. 4 shows a highly simplified schematic illustration of an application device of a second exemplary embodiment of the sowing device according to the invention.

FIG. 4 illustrates partially an exemplary embodiment of the sowing device in which the sensor shaft 31 of the application device is embodied in a relatively narrow fashion and has a funnel-shaped attachment 31*a*. This has the effect that all the seeds K within the sensor shaft 31 move on the same fall lines f or on fall lines f which are located very close to one another, with the result that the impact location I is virtually the same for all the seeds.

However, the seeds can also be positioned in some other way on almost the same fall line or at least on fall lines which are located close to one another. For example, by means of air pressure or electrostatic forces or by means of a sensor shaft which is shaped other than in the manner of a funnel. When electrostatic forces are used, the electrostatic charge of the seeds which arises in this context can have a positive effect on the adhesion of the seed dressing (similar to powder coating technology).

Figure 5:
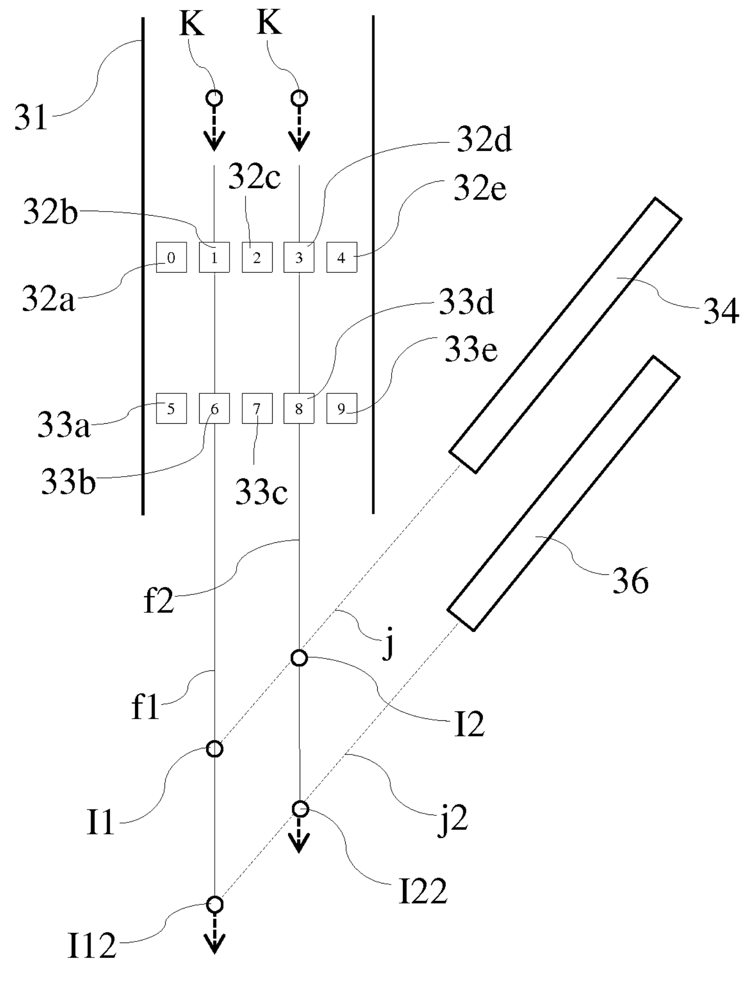
FIG. 5 shows a likewise highly simplified schematic illustration of an application device of a third exemplary embodiment of the sowing device according to the invention.

In the exemplary embodiment of FIG. 5 the sensor shaft 31 is again embodied so as to have a relatively wide available cross section. Seeds K here can fall through the sensor shaft 31 along fall lines that lie comparatively far apart. This helps to prevent disturbance to the movement of the seeds, for example due to collision with the sensor shaft 31 or other seeds, but may lead to the impact location potentially being able to vary significantly in terms of location, depending on the fall line of the seed. For example, illustrated in FIG. 5 are two fall lines f1 and f2 with associated impact locations 11 and 12 which visibly lie significantly far apart and therefore necessitate that the triggering of the application nozzle 34 is performed according to different time delays, depending on the position of the impact location. In order for the controller 35 to be able to calculate an individual time delay ti depending on the location of a seed K that falls through the sensor shaft 31, the transverse position of the respective seed within the sensor shaft 31 is determined by means of a plurality of sensors that are distributed across the width or the diameter, respectively, of the sensor shaft 31. For example, ten such sensors 32*a*, 32*b*, 32*c*, 32*d*, and 32*e*, as well as 33*a*, 33*b*, 33*c*, 33*d*, and 33*e* are schematically illustrated in FIG. 5, wherein in each case two sensors are arranged on top of one another in one fall line, as is the case for the sensors 32 and 33 in FIG. 2. The sensor signals of these ten sensors are fed to the controller 35 (not illustrated here), and the latter by virtue of the sensors that have been active calculates the associated impact location, or the corresponding time delay for triggering the application nozzle 34, respectively.

According to a further exemplary embodiment, the application device can also be equipped with two or more application nozzles (and associated seed dressing reservoir containers) in order for the seeds to be applied to one or more seed dressings, as required. Illustrated in FIG. 5 is a second application nozzle 36 which ejects seed dressing along a second spraying trajectory j2. The latter, conjointly with the fall lines of the seeds, defines a set of second impact locations of which only the impact locations 112 and 122 are illustrated in an exemplary manner in FIG. 5. Of course, the controller 35 calculates individual time delays for triggering the second application nozzle 36 also for this set of impact locations.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of seed treatment, comprising:

separating an individual seed from a reservoir container containing a plurality of seeds;

dispensing the individual seed from the separating along a fall line past an array of sensors to detect the plurality of seeds within a sowing device;

detecting with a first sensor of the array of sensors the individual seed from the dispensing;

detecting with a second sensor of the array of sensors the individual seed from the dispensing;

calculating an impact location for spraying of a seed dressing of the individual seed and a time delay for spraying of the seed dressing of the individual seed based on the detecting with the first sensor and the detecting with the second sensor, wherein the impact location is along the fall line of the individual seed and outside the sowing device; and spraying the seed dressing from an application nozzle onto the individual seed while in free fall at the impact location and with the time delay to produce a treated seed, wherein the treated seed lands on an underlying surface.

2. The method of seed treatment of claim 1, wherein the application nozzle is oriented to perform the spraying at the impact location at an acute angle.

3. The method of seed treatment of claim 2, wherein the acute angle is approximately 30° to 60°.

4. The method of seed treatment of claim 1, wherein the time delay takes into account a flight time of the seed dressing, the detecting with the first sensor, and the detecting with the second sensor.

5. The method of seed treatment of claim 1, wherein the spraying of the seed dressing is in a predefined quantity from 0.3 to 5 μl.

6. The method of seed treatment of claim 1, wherein the spraying of the seed dressing is configured to adhere to the individual seed without a loss of spray.

7. The method of seed treatment of claim 1, wherein the detecting with the first sensor and the detecting with the second sensor occurs within the sowing device in a sensor shaft.

8. The method of seed treatment of claim 7, wherein a transverse position of the individual seed within the sensor shaft is determined by the array of sensors distributed across the width or the diameter of the sensor shaft.

9. The method of seed treatment of claim 1, further comprising detecting with at least one additional sensor whether the individual seed has been hit by the spraying from the application nozzle.

10. The method of seed treatment of claim 9, wherein the detecting with the at least one additional sensor includes detecting a change in reflectance or change in color.

11. The method of seed treatment of claim 1, wherein the spraying of the seed dressing from the application nozzle includes using a pneumatically driven valve.

12. The method of seed treatment of claim 1, wherein the impact location for the individual seed is the same as another individual seed from the plurality of seeds.

13. The method of seed treatment of claim 1, wherein the spraying of the seed dressing is a droplet-shaped application.

14. The method of seed treatment of claim 1, wherein the seed dressing is configured to not dry before the treated seed reaches the underlying surface.

15. The method of seed treatment of claim 1, wherein the underlying surface is an agricultural medium.

16. The method of seed treatment of claim 1, wherein the dispensing the sensor array is configured to not impede a falling movement of the individual seed.

17. The method of seed treatment of claim 1, wherein the spraying includes a feedback control configured to vary at least one spray parameter.

18. The method of seed treatment of claim 17, wherein the at least one spray parameter is at least one of a spray pressure, a spray trajectory, a spray volume, a seed dressing temperature and a seed dressing viscosity.

19. The method of seed treatment of claim 1, wherein an impact location is from 5 cm to 10 cm from the application nozzle.

20. A method of seed treatment, comprising:

separating individual seeds from a reservoir container containing a plurality of seeds;

dispensing the individual seeds from the separating along a plurality of fall lines past an array of sensors to detect the plurality of seeds within a sowing device;

detecting with a first sensor of the array of sensors the individual seeds from the dispensing;

detecting with a second sensor of the array of sensors the individual seeds from the dispensing;

calculating an impact location for spraying of a seed dressing for each of the individual seeds and a time delay for spraying of a seed dressing on each of the individual seeds based on the detecting with the first sensor and the detecting with the second sensor, wherein the impact locations are along the fall line of each of the individual seeds and outside the sowing device; and spraying the seed dressing from an application nozzle to the individual seeds while in free fall at the impact locations and with the time delays to produce treated seeds, wherein the treated seeds land on an underlying surface.

* * * * *